United States Patent [19]

Hata et al.

[11] Patent Number: 4,931,728
[45] Date of Patent: Jun. 5, 1990

[54] ROTATION DETECTING DEVICE HAVING A TERMINAL HOLDING ARRANGEMENT

[75] Inventors: Yasuaki Hata; Takeshi Yasukawa; Masayoshi Onishi, all of Himeji, Japan

[73] Assignee: Mitsubishi Denki Kabushiki Kaisha, Tokyo, Japan

[21] Appl. No.: 371,559

[22] Filed: Jun. 23, 1989

Related U.S. Application Data

[62] Division of Ser. No. 201,856, Jun. 3, 1988, Pat. No. 4,888,551.

[30] Foreign Application Priority Data

Jun. 4, 1987 [JP] Japan .............................. 62-87050[U]
Jun. 4, 1987 [JP] Japan .............................. 62-87051[U]
Jun. 4, 1987 [JP] Japan .............................. 62-87049[U]

[51] Int. Cl.$^5$ .................... G01B 7/14; H01F 15/10; H01R 9/00; G01P 3/488
[52] U.S. Cl. ............................ 324/207.15; 324/174; 324/207.22; 324/207.25; 336/192; 439/686; 439/733

[58] Field of Search ............... 324/173, 174, 207, 208; 336/192; 439/686, 733, 750

[56] References Cited

U.S. PATENT DOCUMENTS

| 3,910,671 | 10/1975 | Townsend | 439/750 X |
| 4,074,929 | 2/1978 | Krider | 439/733 |
| 4,413,875 | 11/1983 | Mattingly | 439/733 X |
| 4,772,228 | 9/1988 | Seymour | 439/733 X |
| 4,772,229 | 9/1988 | Nix et al. | 439/733 |

*Primary Examiner*—Gerard R. Strecker
*Attorney, Agent, or Firm*—Oblon, Spivak, McClelland, Maier & Neustadt

[57] ABSTRACT

A rotation detecting device comprising a pole formed of a ferromagnetic material, a bias magnet for applying a magnetic flux to the pole, a bobbin receiving the pole and the bias magnet in a series arrangement, a detecting coil mounted on the bobbin, terminals each having a coil connecting part connected to one end of the wire of the coil and a lead wire connecting part connected to a lead wire, a cap for covering the terminals and a portion of the bobbin holding the terminals, fixing means for fixing the terminals to the bobbin.

2 Claims, 5 Drawing Sheets

ROTATION DETECTING DEVICE HAVING A TERMINAL HOLDING ARRANGEMENT

This is a division of application Ser. No. 201,856 filed on June 3, 1988, now U.S. Pat. No. 4,888,551.

BACKGROUND OF THE INVENTION

1. Field of the Invention

The present invention relates to a rotation detecting device for detecting the angular displacement of a magnetic body and capable of improving the reliability of finishing the ends of a detecting coil.

2. Discussion of Background

The conventional magnetic rotation detecting device has a magnetic circuit comprising (1) a pole, (2) a bias magnet and (3) a detecting coil.

A high output voltage of the detecting coil can be obtained by means such as (a) providing a fixed pole having a high magnetic permeability, (b) providing a bias magnet having a high magnetic flux density or (c) increasing the number of turns of the detecting coil. Generally, the means (c) is employed to obtain a high output voltage of the detecting coil.

However, a very thin wire must inevitably be used for forming the detecting coil to increase the number of turns within a limited space and ordinarily a wire of 0.13 mm to 0.15 mm in diameter is used for forming such a detecting coil. The ends of the wire are connected to terminals for lead wires, for example, by soldering. If the junctions of the ends of the wire and the terminal is stressed locally, the coil may possibly be disconnected from the terminal or terminals.

Referring to FIGS. 5, 6(A) and 6(B) showing a conventional rotation detecting device, there are shown a pole 1 formed of a ferromagnetic material, a bias magnet 2 for applying a magnetic flux to the pole 1, a spacer 3 for enhancing the effective magnetic flux of the bias magnet 2, a bobbin 4 receiving the pole 1 therein, a detecting coil 5 wound on the bobbin 4, the ends 5a of a wire forming the detecting coil 5, which are respectively wound around the connecting sections 6a of terminals 6 provided on the bobbin 4, and lead wires 7 respectively connected to the lead connecting sections 6b of the terminals 6.

Projections 4a and 4b are provided respectively at predetermined positions on the outer circumference of the bobbin 4. The projection 4a is engaged with a cap 8, and the terminals 6 are fitted respectively on the projection 4b. The pole 1, the bias magnet 2 and the spacer 3 are fixed in place by the cap 8. The lead wires 7 are connected respectively to the terminals 6 by putting the cap 8 on the projection 4a. The bobbin 4 mounted with the detecting coil 5 is received in a housing 10 formed of a plastic material such as Nylon by injection molding. The housing 10 is attached to a transmission case or the like with a screw so that the rotation detecting device is disposed near a rotary member. The housing 10 has a cylindrical fitting part 10a, a reduced part 10b having a diameter smaller than that of the fitting part 10a, an annular groove 10c for receiving an O-ring 11 therein, and a supporting part 10d. A locking bush 12 is provided in the supporting part 10d of the housing 10 to prevent the screw fastening the housing 10 to a transmission case or the like from loosening.

When the rotation detecting device is mounted on the transmission case, the pole 1 is located near a projection provided on the rotary member. When the projection of the rotary member approaches the pole 1 as the rotary member rotates, the magnetic lines of force of the bias magnet 2 extend from the bias magnet 2 through the pole 1, the rotary member, the external space and the spacer 3 to the bias magnet 2. Since the magnetic lines of force extend across the coil 5, voltage is induced in the detecting coil 5 as the magnetic flux varies according to the variation of the distance between the projection of the rotary member and the pole 1. The rotating speed of the rotary member is calculated by using the induced voltage. Such an induced voltage induced in the coil of the rotation detecting device is used also for detecting the approach of an object.

In assembling this conventional rotation detecting device, the connection of the lead wires 7 and the terminals 6 and the connection of the ends 5a of the wire of the coil 5 and the terminals 6 are implemented in the following procedure.

(1) The lead wires 7 are fixedly connected to the lead wire connecting parts of the terminals 6 by crimping.

(2) The ends of the wires of the detecting coil 5 are wound several turns respectively around the U-shaped coil connecting parts 6a of the terminals 6, and then the ends of the wires of the detecting coil 5 are fixed to the coil connecting parts 6a by soldering.

(3) The lead wire connecting parts 6b of the terminals 6 are placed between the projections 4a and 4b of the bobbin 4.

(4) The cap 8 is put on the housing 10 so as to cover the terminals 6, the rear part of the bobbin 4 and the extremities of the lead wires 7.

When the rotation detecting device is thus assembled, a clearance $\Delta x$ in the range of 0.2 mm to 0.3 mm is formed between the rear end of the lead wire connected parts 6b of the terminals 6 and the projection 4a of the bobbin 4, and hence the terminals 6 are movable to the left, as viewed in FIG. 6(B), by a distance $\Delta x$ when the lead wires 7 are pulled to the left. Therefore, the wire of the coil 5 maay possibly be broken when the lead wires 7 are pulled to the left if the slack of the wire between the coil 5 and the coil connecting parts 6a of the terminals 6 is smaller than the clearance $\Delta x$. Such a trouble occurs before injection molding and will not occur after injection molding because the terminals 6 are fixed by the molding and the ends 5a of the wire of the coil 5 will not be pulled even if the lead wires 7 are pulled.

However, in placing the assembly of the bobbin 4, the coil 5, the terminals 6 and the lead wires 7 in a mold for injection molding, the lead wires 7, in general, are pulled to set the assembly accurately in the mold, which often causes the breakage of the ends 5a of the wire of the coil 5.

SUMMARY OF THE INVENTION

Accordingly, it is an object of the present invention to provide a rotation detecting device constructed so that no force acts on the ends of the wire of the coil even if the lead wires are stressed by an external force such as tension, capable of preventing the breakage of the wire of the coil, and having remarkably improved reliability.

To achieve the object of the invention, the present invention provides a rotation detecting device comprising a pole formed of a ferromagnetic material, a bias magnet for applying a magnetic flux to the pole, a bobbin receiving the pole and the bias magnet in a series arrangement, a detecting coil mounted on the bobbin, terminals each having a coil connecting part connected to one end of the wire of the coil and a lead wire connecting part connected to a lead wire, a cap for covering the terminals and a portion of the bobbin holding the terminals, fixing means for fixing the terminals to the bobbin.

BRIEF DESCRIPTION OF THE DRAWINGS

The above and other objects, features and advantages of the present invention will become apparent from the following description taken in conjunction with the accompanying drawings, in which.

DETAILED DESCRIPTION OF THE PREFERRED EMBODIMENTS

Figure 5:
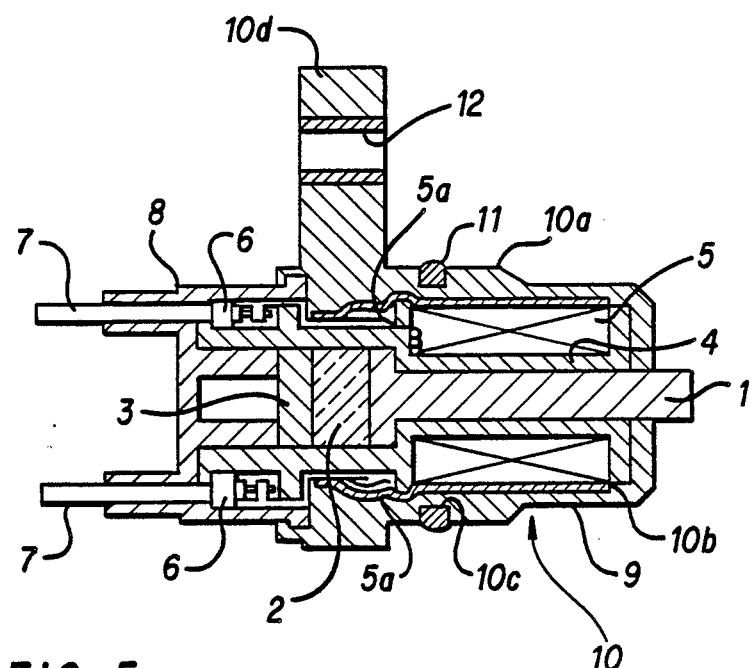
FIG. 5 is a longitudinal sectional view of a conventional rotation detecting device.
Figure 6A:
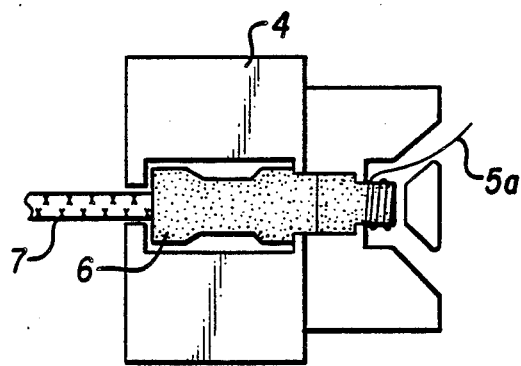
FIG. 6(A) is an enlarged fragmentary plan view of the conventional rotation detecting device of FIG. 5, showing a terminal and a bobbin.
Figure 6B:
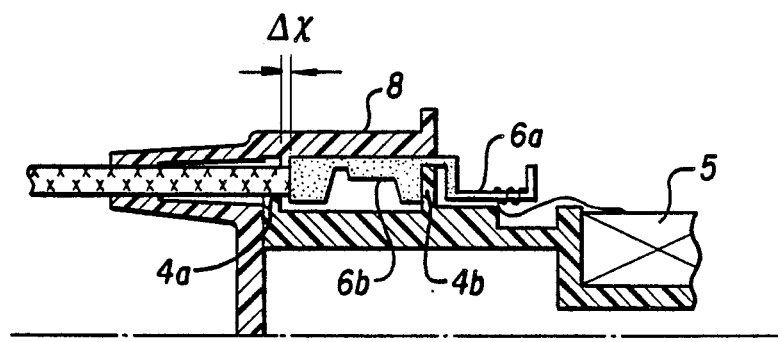
FIG. 6(B) is an enlarged fragmentary longitudinal sectional view of the rotation detecting device of FIG. 6(A).

In the following description of the preferred embodiments of the present invention, parts similar to those previously described with reference to FIGS. 5, 6(A) and 6(B) showing the conventional rotation detecting device will be denoted by like reference numerals and the description thereof will be omitted. Only the features of the present invention will be described hereunder.

Figure 1A:
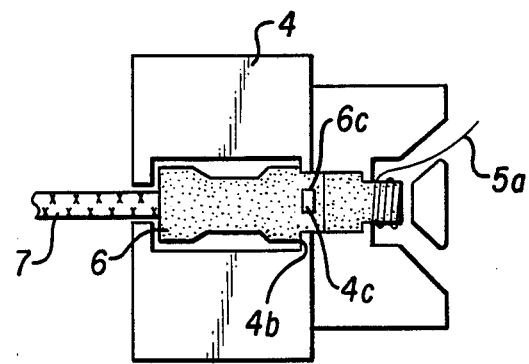
FIG. 1(A) is an enlarged fragmentary plan view of a rotation detecting device, in a first embodiment, according to the present invention, showing a terminal and a bobbin.
Figure 1B:
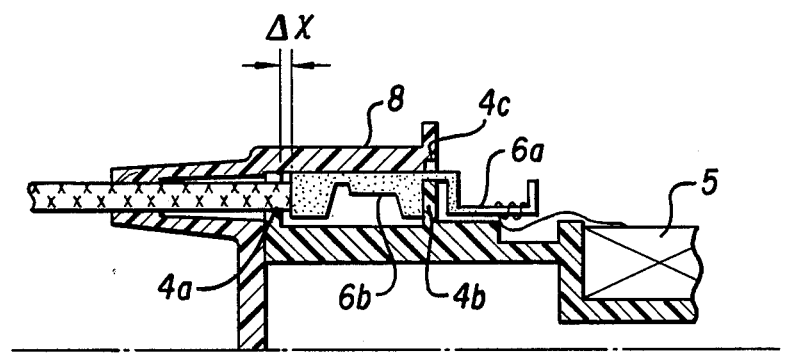
FIG. 1(B) is an enlarged fragmentary longitudinal sectional view of the rotation detecting device, corresponding to FIG. 1(A)

Referring to FIGS. 1(A) and 1(B), a rotation detecting device comprises a bobbin 4, terminals 6, a cap 8, and other components which are similar to those of the conventional rotation detecting device. A positioning hole 6c is formed in the upper surface, as viewed in FIG. 1(A), namely, in the surface opposite the lead wire holding surface, of a terminal 6.

A positioning projection 4c is formed in a bobbin 4 at a position corresponding to the positioning hole 6c of each of the terminals 6 on the bobbin 4 when the terminals 6 are mounted on the bobbin 4 at correct positions. The positioning projections 4c may be formed integrally with the bobbin 4 or may be separate members attached to the bobbin 4.

In assembling the rotation detecting device, the terminals 6 are mounted on the bobbin 4 so that the positioning projections 4c of the bobbin 4 engage the positioning holes 6c of the terminals 6, respectively, and then a cap 8 is pressed against the bobbin 4 to receive the assembly of the bobbin 4 and the terminals 6 therein. Since the positioning projections 4c of the bobbin 4 engage the positioning holes 6c of the terminals 6, the terminals 6 are held fixedly on the bobbin 4 and are unable to move relative to the bobbin 4 even if there is a clearance $\Delta x$ between the rear end of the terminals 6 and projections 4a formed in the bobbin 4 and even if an external force is applied to lead wires 7 connected to the terminals 6 after assembly, and thereby the accidental breakage of the wires of the detection coil 5 is prevented to enhance the reliability of the rotation detecting device.

Figure 2A:
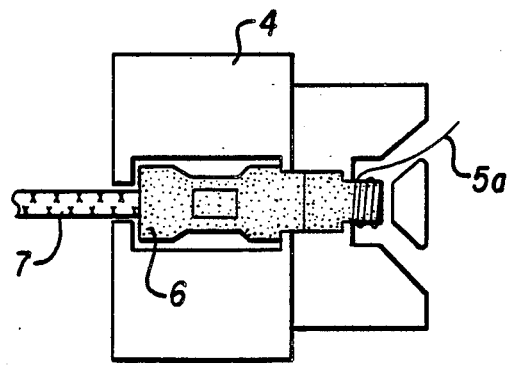
FIG. 2(A) is an enlarged fragmentary plan view, similar to FIG. 1(A), of a rotation detecting device, in a second embodiment, according to the present invention, showing a terminal and a bobbin.
Figure 2B:
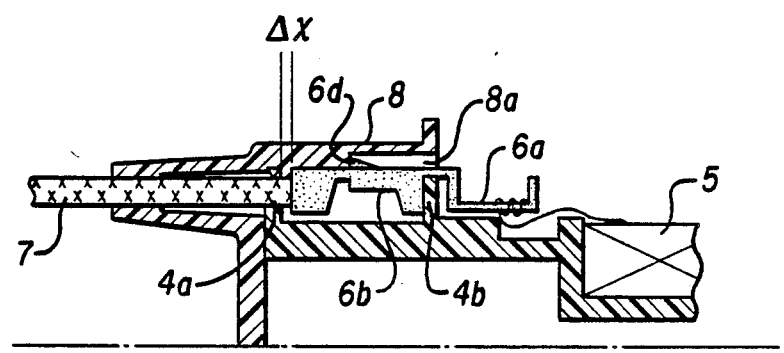
FIG. 2(B) is an enlarged fragmentary longitudinal sectional view of the rotation detecting device of FIG. 2(A)

Referring to FIGS. 2(A) and 2(B), a rotation detecting device comprises a bobbin 4, terminals 6, a cap 8, and other components which are similar to those of the conventional rotation detecting device. A sawtooth ridge 6d having an upright rear end surface is formed in the central part of the upper surface, as viewed in FIG. 2(B) of the lead wire holding part 6b of each terminal 6 so as to extend along the axis of the bobbin 4. Axial grooves 8a respectively for receiving the sawtooth ridges 6d of the terminals 6 are formed in the inner circumference of the cap 8. When the cap 8 is put in place on the bobbin 4, the upright rear end surfaces of the sawtooth ridges 6d are in contact respectively with the end walls of the axial grooves 8a of the cap 8.

In assembling the rotation detecting device, the terminals 6 are mounted on the bobbin 4 between projections 4a and 4b of the bobbin 4, and then the assembly of the bobbin 4 and the terminals 6 are pushed into the cap 8 as deep as the upright rear end surfaces of the sawtooth ridges 6d of the terminals 6 come into contact respectively with the end surfaces of the axial grooves 8a, and thereby the terminals 6 are held fixedly between the bobbin 4 and the cap 8.

Thus, the second embodiment is the same in effect as the first embodiment.

Figure 3A:
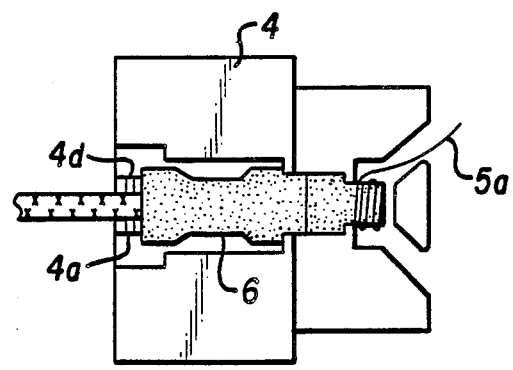
FIG. 3(A) is an enlarged fragmentary plan view, similar to FIG. 1(A), of a rotation detecting device, in a third embodiment, according to the present invention, showing a terminal and a bobbin.
Figure 3B:
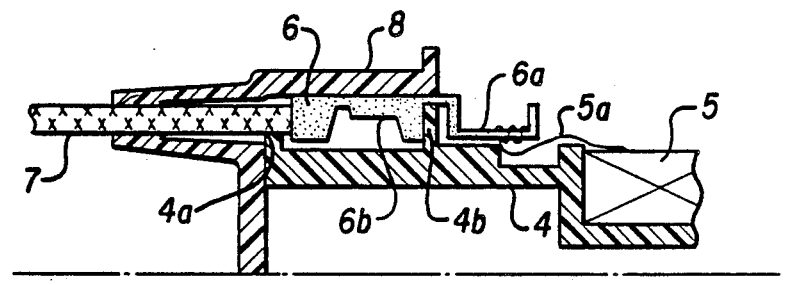
FIG. 3(B) is an enlarged fragmentary longitudinal view of the rotation detecting device of FIG. 3(A)
Figure 4:
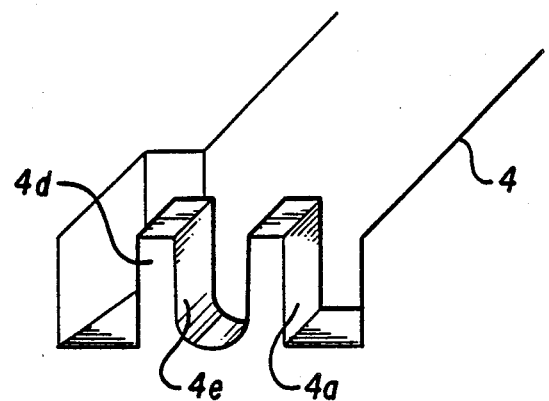
FIG. 4 is an enlarged fragmentary perspective view of part of the bobbin employed in the third embodiment.

Referring to FIGS. 3(A), 3(B) and 4, a rotation detecting device comprises a bobbin 4, terminals 6, a cap 8, and other components which are similar to those of the conventional rotation detecting device. The bobbin 4 has two pairs of projections 4a and 4d capable of being deformed easily by a small pressure and formed integrally therewith at the rear end, namely, at the left end as viewed in FIG. 3(B), thereof. In each pair of projections, 4a and 4d are separated from each other by a predetermined distance to form a U-shaped groove 4e therebetween as best shown in FIG. 4. A lead wire 7 is extended through the U-shaped groove 4e and is held between the pair of projections 4a and 4d.

In assembling the rotation detecting device, the terminals 6 are put in place on the bobbin 4 between the pairs of projections 4a and 4d, and projections 4b, respectively. Then, the assembly of the bobbin 4 and the terminals 6 is pushed into the cap 8 as far as the rear end of the bobbin 4 comes into contact with the inner bottom surface of the cap 8. As the assembly of the bobbin 4 and the terminals 6 is pushed into the cap 8, the pairs of projections 4a and 4d are bent toward the front end, namely, the right end as viewed in FIG. 3(B), of the bobbin 4 to press the terminals 6 respectively against the projections 4b of the bobbin 4, and thereby the terminals 6 are held firmly respectively between the pairs of the projections 4a and 4d, and the projections 4b.

The third embodiment is the same in effect as the first embodiment.

Although the invention has been described with reference to preferred forms thereof with a certain degree of particularity, obviously many changes and variations are possible therein. It is therefore to be understood the present invention may be practiced otherwise than specifically described herein without departing from the scope and spirit thereof.

What is claimed is:

1. A rotation detecting device comprising:
   a pole formed of a ferromagnetic material;
   a bias magnet for applying a magnetic flux to the pole;
   a bobbin receiving the pole and the bias magnet in a series arrangement;
   a detecting coil mounted on the bobbin;
   a pair of terminals each having a coil connecting part connected to a separate end of the wire of the coil and a lead wire connecting part connected to a separate lead wire, said terminals being received within said bobbin;
   a cap which fits around said bobbin for covering the terminals and a portion of the bobbin holding the terminals;
   fixing means for fixing the terminals to the bobbin, the fixing means being sawtooth ridges formed respectively in the outer surfaces of the terminals, and grooves formed in the cap, capable of receiving the sawtooth ridges therein, respectively, the respective end surfaces of the grooves engaging the upright end surfaces of the sawtooth ridges, respectively, when the cap is put on the assembly of the bobbin and the terminals.

2. A rotation detecting device comprising:
   a pole formed of a ferromagnetic material;
   a bias magnet for applying a magnetic flux to the pole;
   a bobbin receiving the pole and the bias magnet in a series arrangement;
   a detecting coil mounted on the bobbin;
   a pair of terminals each having a coil connecting part connected to a separate end of the wire of the coil and a lead wire connecting part connected to a separate lead wire, said terminals being received within said bobbin;
   a cap which fits around said bobbin for covering the terminals and a portion of the bobbin holding the terminals;
   fixing means for fixing the terminals to the bobbin, the fixing means being a plurality of pairs of deformable projections formed in the bobbin, the deformable projections of each pair being spaced apart from each other by a predetermined distance so as to define a U-shaped groove therebetween, the pairs of deformable projections being deformed so as to hold the lead wires firmly therebetween when the cap is put on the bobbin.

* * * * *